United States Patent
Bakovic et al.

(10) Patent No.: US 11,566,750 B2
(45) Date of Patent: Jan. 31, 2023

(54) APPARATUS AND METHOD FOR EXECUTING A SAFETY FUNCTION

(71) Applicant: PILZ GMBH & CO. KG, Ostfildern (DE)

(72) Inventors: Daniel Bakovic, Ostfildern (DE); Juergen Pullmann, Ostfildern (DE); Bernd Neuschwander, Ostfildern (DE)

(73) Assignee: Pilz GmbH & Co. KG, Ostfildern (DE)

(*) Notice: Subject to any disclaimer, the term of this patent is extended or adjusted under 35 U.S.C. 154(b) by 219 days.

(21) Appl. No.: 17/011,307

(22) Filed: Sep. 3, 2020

(65) Prior Publication Data
US 2021/0062969 A1 Mar. 4, 2021

(30) Foreign Application Priority Data
Sep. 3, 2019 (DE) ............ 10 2019 123 581.2

(51) Int. Cl.
*F16P 3/14* (2006.01)
*G05B 19/406* (2006.01)
(Continued)

(52) U.S. Cl.
CPC ............ *F16P 3/142* (2013.01); *G05B 19/406* (2013.01); *G06T 7/0002* (2013.01); *G06T 7/251* (2017.01); *G06V 10/44* (2022.01); *H04N 9/3161* (2013.01)

(58) Field of Classification Search
CPC ..... F16P 3/142; G05B 19/406; G05B 19/042; G06T 7/0002; G06T 7/251; G06V 10/44; H04N 9/3161; H04N 7/18; H04N 17/002
See application file for complete search history.

(56) References Cited

U.S. PATENT DOCUMENTS

2013/0201292 A1   8/2013   Walter et al.
2017/0120460 A1*  5/2017   Burmeister ............ G08B 7/06
(Continued)

FOREIGN PATENT DOCUMENTS

DE    295 20 980 U1    6/1996
DE    100 17 333 A1   10/2001
(Continued)

OTHER PUBLICATIONS

European Standard—EN ISO 13849-1; Nov. 2006; 97 pages.
European Standard—DIN EN ISO 12100-1; Apr. 2004; 39 pages.

*Primary Examiner* — Chan S Park
*Assistant Examiner* — Daniel C Chang
(74) *Attorney, Agent, or Firm* — Miller Johnson

(57) ABSTRACT

An apparatus and method for executing a safety function is particularly applicable to monitoring a safety area of a technical installation. An imaging unit acquires an event that triggers the safety function within a defined working area. A controller carries out a safety-related reaction depending on the triggering event. A test unit is configured to verify the operability of the imaging unit and includes a processing unit and a projection unit. The projection unit projects a pattern with defined properties into the working area. The processing unit evaluates the image data acquired by the imaging unit to detect the projected pattern within the acquired image data. Further, the processing unit extracts the specific properties of the detected projected pattern, and compares the specific properties of the detected projected pattern with the defined properties.

18 Claims, 3 Drawing Sheets

(51) Int. Cl.
*H04N 9/31* (2006.01)
*G06T 7/00* (2017.01)
*G06T 7/246* (2017.01)
*G06V 10/44* (2022.01)

(56) References Cited

U.S. PATENT DOCUMENTS

2017/0329321 A1\* 11/2017 Dai .................... G05B 9/02
2018/0071914 A1\* 3/2018 Heidemann ............ F16P 3/142

FOREIGN PATENT DOCUMENTS

| | | |
|---|---|---|
| DE | 10 245 720 A1 | 4/2004 |
| DE | 20 2006 014 318 U1 | 12/2006 |
| DE | 10 2007 031 157 A1 | 6/2008 |
| DE | 10 2010 036 852 A1 | 2/2012 |
| DE | 10 2017 008 638 A1 | 3/2018 |
| EP | 0 902 402 A2 | 3/1999 |

\* cited by examiner

APPARATUS AND METHOD FOR EXECUTING A SAFETY FUNCTION

CROSS-REFERENCE TO RELATED APPLICATIONS

This application claims priority to German Application No. 10 2019 123 581.2 filed Sep. 3, 2019. The entire disclosure of the application referenced above is incorporated by reference.

FIELD

The present disclosure relates to an apparatus and a method for carrying out a safety function, in particular for monitoring a safety area of a technical installation.

BACKGROUND

A safety function according to the present disclosure is a safety-related control function of a machine that reduces a risk arising from the machine to an acceptable level. For Europe, the term safety function is defined in the DIN EN ISO 13849-1 and DIN EN ISO 12100 standards, for example.

Apparatuses that carry out a safety function usually operate according to an input-process-output principle, as is usual in automation technology. In addition to a normal control activity, an apparatus carrying out a safety function must guarantee error safety in all process steps. In the input-process-output procedure, the input comprises the acquisition of states within a defined working area by suitable sensors. The processing step comprises the linking of the detected states, the assessment of whether the detected states comprise an event that triggers the safety function and the actuation of a safety-related reaction if such an event has been detected. The output comprises controlling control elements of the installation or process that is to be monitored and the execution of the safety-related reaction to transfer the installation or the process into a safe state if an event that triggers the safety function is detected.

Using imaging sensors as sensors for input has come into focus. These allow the greatest possible flexibility and adaptability. Imaging sensors can be used in different scenarios, thus covering a wide range of applications. However, it is problematic when using imaging sensors to make them sufficiently fail-safe so that they are suitable as input for a safety function. It has been shown that although many standard camera systems (2D and 3D) generally are suitable for industrial use as imaging sensors, they are not sufficiently fail-safe on their own to be used for a safety-critical application. From today's point of view, the realization of a safe camera system that meets the requirements of the relevant safety standard is difficult and complex.

DE 10 245 720 A1 discloses an example of a safe camera system.

SUMMARY

It is an object of the present disclosure to specify an apparatus that enables a safety function to be carried out using an imaging sensor in a simpler and less complex manner. Furthermore, it is an object to specify an apparatus for carrying out a safety function that can use standard components such as a standard, non-failsafe camera.

According to an aspect of the present disclosure, there is provided an apparatus for carrying out a safety function, in particular for monitoring a safety area of a technical installation, comprising: an imaging unit for detecting an event that triggers the safety function within a defined working area, a controller for carrying out a safety-related reaction based on the triggering event, and a test unit for verifying the operability of the imaging unit comprising a processing unit and a projection unit. The projection unit is configured to project a pattern with defined properties into the working area and the processing unit is configured to evaluate the image data acquired by the imaging unit to detect the projected pattern with in the acquired image data, extract specific properties of the detected projected pattern, and compare the specific properties of the detected projected pattern with the defined properties.

According to a further aspect of the present disclosure, there is provided a method for carrying out a safety function, in particular for monitoring a safety area of a technical installation. The method, comprising:
  providing an imaging unit for acquisition of an event that triggers the safety function within a defined working area,
  providing a controller for carrying out a safety-related reaction based on the triggering event, and
  providing a test unit comprising a processing unit and a projection unit for verifying the operability of the imaging unit,
wherein the projection unit projects a pattern with defined properties into the working area, wherein the processing unit evaluates the image data acquired by the imaging unit to detect the projected pattern within the acquired image data, extracts specific properties of the detected projected pattern, and compares the specific properties of the detected projected pattern with the defined properties.

According to a further aspect of the present disclosure, there is provided a test unit for verifying the operability of an imaging unit, comprising a processing unit and a projection unit, wherein the projection unit is configured to project a pattern with defined properties into a working area, and wherein the processing unit is configured to evaluate the image data acquired by the imaging unit to detect the projected pattern within the acquired image data, extract specific properties of the detected projected pattern, and compare the specific properties of the detected projected pattern with the defined properties.

It is thus an idea of the present disclosure to equip an apparatus for carrying out a safety function using imaging sensors with a test unit that checks the operability of the imaging unit. "Operability of the imaging unit" in this context means that the imaging unit functions as intended and provides image data in an expected manner. The test unit makes it possible to use an imaging unit that does not itself have a fail-safe set-up to provide a fail-safe input for a safety function. Thereby, it is possible to dispense with the need for integral and complex protection means for the imaging unit such as redundant design of the main components.

Furthermore, the imaging unit does not have to perform runtime tests (RAM test, ROM test, shutdown test, etc.) that are common for safety sensors. Instead, the operability of one or more imaging units is verified (checked) by a separate test unit. Thus, it is possible to provide an apparatus that can guarantee sufficient safety overall without each individual component being fail-safe on its own. This has the advantage that only those components are made fail-safe that must necessarily be fail-safe, while standard components that are not failsafe themselves are used for other components. Thereby, a cost-effective and at the same time fail-safe system can be provided that is suitable for carrying out a safety function using imaging sensors as input, and thus allowing a flexible design. In this way, functional safety can be implemented particularly efficiently, flexibly and cost-effectively.

In a further refinement, the controller is configured to carry out the safety-related reaction based on the comparison of the specific properties with the defined properties.

According to this refinement, the controller thus triggers the safety-related reaction when not only an event that triggers the safety function has been detected, but also when the pattern recognition has failed, since it is to assume that the imaging unit is not operating properly. Thereby, a high level of safety can be guaranteed even if the imaging unit and its coupling to the controller itself are not configured in a fail-safe manner. The refinement thus further contributes to a particularly simple implementation of the apparatus.

In a further refinement, the controller is a safety controller with safety-related set-up, wherein solely the safety controller is configured to ensure fail-safe execution of the safety-related reaction.

According to this refinement, only the controller has to be configured as safe equipment. The refinement has the advantage that the imaging unit and the test unit itself do not have to be fail-safe, while the entire fail-safe evaluation is carried out by the controller as a safety controller (FS-controller). The safety-related set-up can thus be concentrated in one device. Accordingly, only this device must meet the requirements of a fail-safe design and receive certification in accordance with the standard. Thereby, a safety application can be implemented easily and cost-effectively.

In a further refinement, the test unit is at least partially integrated into the safety controller or configured as a module for it, and at least the processing unit makes use of the safety-related set-up to ensure that the processing unit is fail-safe.

According to this refinement, the test unit is thus partially integrated into the safety controller. This can be achieved in the form of software modules, for example, which are executed on the safety controller and which use the safety-related set-up within the safety controller during execution. For example, such a software module can benefit from a redundant design of the processors of the safety controller to verify its own program flow. Thus, the test unit can be implemented at low cost, since components of the safety controller can be shared.

In a further refinement, the controller is configured to set the defined properties of the pattern.

According to this refinement, the controller can thus specify the pattern and, in connection with this, define an expectation of the image data supplied by the imaging sensors. Thereby, the safety apparatus can be implemented easily, with the essential elements being concentrated within the controller.

In a further refinement, the pattern is a dynamic pattern in which the defined properties change continuously over time.

By continuously changing the pattern, it can be determined easily and in a reliable manner, whether the imaging sensors are working properly. The intervals at which the pattern changes can be selected in such a way that an overall system response time of sufficient magnitude can be guaranteed. The apparatus can thus be used for high safety levels. The intervals can be selected so that they are less than or equal to the response time required for the safety application.

In a further refinement, the defined properties change systematically at least in an initial time interval.

"Systematic" in this context means that the pattern changes over time in a predetermined way. This facilitates implementation, since by the predefined change the expected values are also predefined. The systematic approach has the further advantage that certain errors cannot only be detected, but also their source of error can be identified if necessary.

In a further refinement, the defined properties change randomly at least in a second time interval.

A random change has the advantage that systematic errors can be reliably detected. Systematic and random changes can thus be combined in such a way that the widest possible range of errors can be detected and their causes identified.

In a further refinement, the defined properties include a positional information and the projection unit is configured to project the pattern into the working area according to the positional information.

Positional information can easily be converted into a pattern and verified by the processing unit. The positional information can be a spatial coordinate, for example, or another position where the pattern is to appear in the working area/space. The refinement further facilitates implementation.

In a further refinement, the working area is divided into a number of defined segments and the projection unit is configured to generate the pattern at least once in each defined segment within a defined period of time.

According to this refinement, the working area is thus divided into segments in which the pattern is created at least once in a defined period of time. The division into segments allows flexible adjustment of an area in which the operability of the imaging unit must be checked. The verification can thus be limited to certain defined areas, which simplifies the verification processing of the imaging unit and allows adaptation for different scenarios.

In a further refinement, the working area is a three-dimensional working space and the pattern has a three-dimensional characteristic as a defined property that can be detected by the imaging unit and which changes continuously over time.

According to this refinement, the apparatus can be also used to monitor a three-dimensional working space, wherein a pattern with a three-dimensional characteristic is used to verify operability of the imaging unit. The three-dimensional characteristic can be a three-dimensional spatial coordinate, for example. The advantage of monitoring a three-dimensional working space is that the apparatus can be adjusted flexibly to different application scenarios.

In a further refinement, the pattern is a dot pattern and the projection unit can be a laser projector.

A dot pattern is easy to create and its occurrence can easily be extracted from the image data. Using a laser projector, the dot pattern can be easily projected at defined points in the working area. The refinement thus contributes to a very cost-effective implementation of the apparatus.

In a further refinement, the imaging unit is a non-safe camera unit that is unable to ensure a fail-safe detection autonomously (independently).

Using a non-secure camera unit has the advantage that standard cameras can be used, which makes the implementation of the apparatus particularly cost-effective.

It goes without saying that the features mentioned above and those to be explained below can be used not only in the combination indicated in each case, but also in other combinations or on their own, without leaving the scope of the present invention.

BRIEF DESCRIPTION OF THE DRAWINGS

Embodiments of the invention are shown in the drawings and are explained in more detail in the following description.

DETAILED DESCRIPTION

Figure 1:
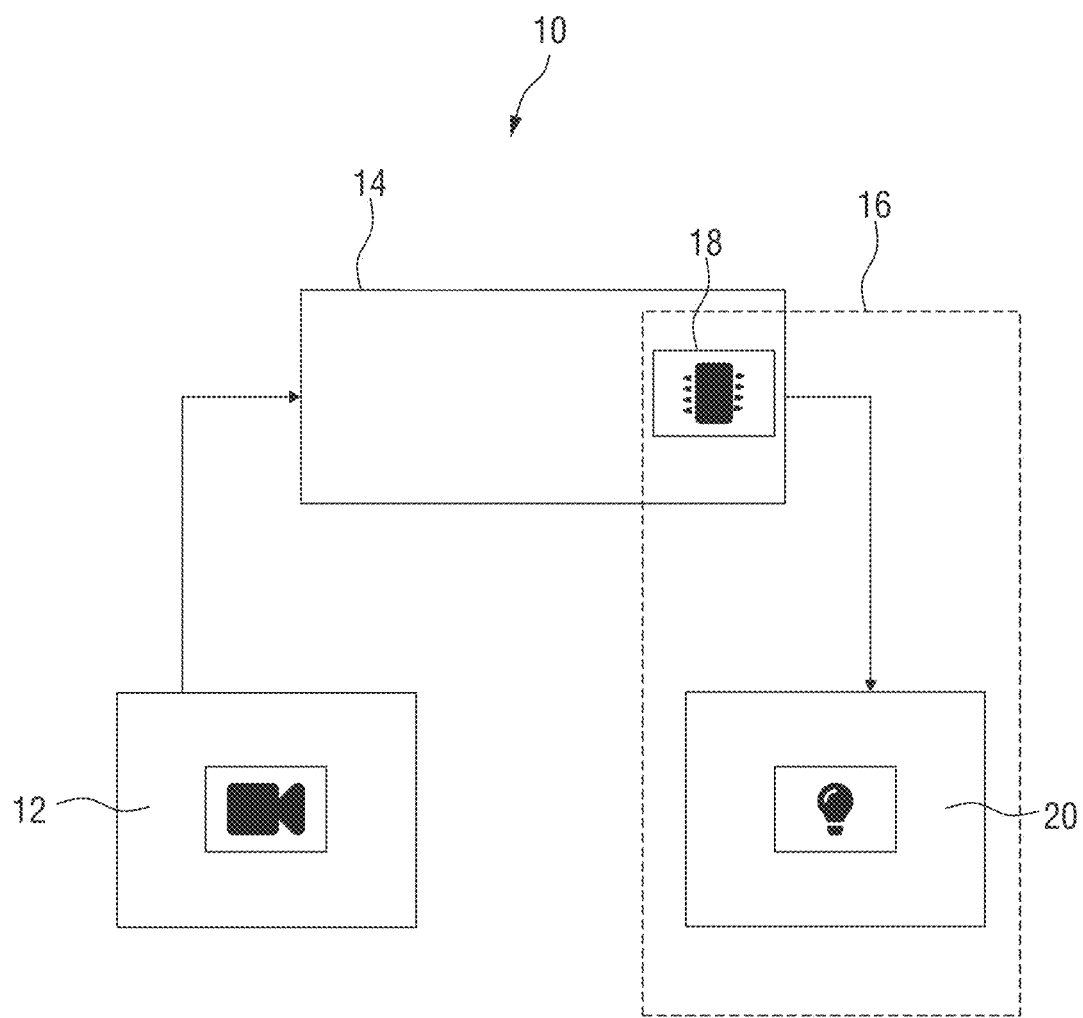
FIG. 1 is a schematic representation of an apparatus for carrying out a safety function according to an example embodiment.

FIG. 1 shows a schematic representation of an apparatus for carrying out a safety function according to an example embodiment of the present invention.

The apparatus is denoted in its entirety by reference numeral 10 and comprises an imaging unit 12, a controller 14, and a test unit 16. The test unit comprises a processing unit 18 and a projection unit 20.

The imaging unit 12 is configured to monitor a safety area of a technical installation. The imaging unit 12 can be a video camera that can capture and, if necessary, store moving images of a defined working area. The imaging unit 12 can be a single camera or a network of several cameras (camera network). In a camera network, recordings from several cameras can be combined to generate the image data.

The image data provided by the imaging unit 12 may include information in addition to two-dimensional information. The image data may include information from which three-dimensional information of the working area can be derived. Three-dimensional information can be provided directly by certain types of cameras (e.g. time-of-flight cameras) or determined from different images by suitable image processing.

The imaging unit 12 can be a standard camera. The term "standard camera" in this context refers to a camera that has no safety-related set-up other than the recording equipment. Safety-related set-up refers to equipment that serves to execute or monitor safety-related actions without errors and, in the event of an error, to execute a defined action reliably. In other words, a standard camera in the sense of the present invention is a camera whose data cannot be directly used to perform a safety function independently. A standard camera can therefore not verify and guarantee its proper operation according to the relevant safety standards.

The imaging unit 12 is connected to the controller 14. The controller 14 can be any controller that can influence a technical installation in a defined manner. The controller 14 can be a safety controller (FS-controller), which is configured to perform a control task in a fail-safe manner.

A safety controller is configured to implement a safety function according to the standards DIN EN ISO 13849-1 and DIN EN ISO 12100. The term safety function is defined in this context as a safety-related control function of a machine that reduces a risk emanating from the machine to an acceptable level. The concrete definition of the safety function for a technical installation is subject to an individual assessment of the technical installation to be monitored.

The safety controller ensures the proper execution of the safety function during operation of the technical installation. In the event that the safety function cannot be guaranteed, the safety controller transfers the technical installation into a safe state. For example, the safety controller may switch off the technical installation. A safety controller can be implemented as a simple switching device, a modular combination of individual switching devices, a configurable controller, or a programmable logic controller (PLC). When in the following reference is made to a controller, a safety controller in the meaning as outlined above is assumed.

Usually a controller works according to an input-processing-output principle. The controller receives an input signal via one or more sensors (input), evaluates it (processing) and controls the technical installation via defined outputs (output). A safety controller can have safe outputs that only permit operation of the technical installation if a corresponding input signal is present and the corresponding output signal is provided by the controller.

It goes without saying that in this case, in addition to the safety controller and the safe outputs, the sensor system must also be designed in such a way that it only delivers reliable values if it functions properly. This means that it must be ensured that the sensors only supply the input signal if they and their communication interface to the controller are operating properly. In the case of imaging sensors, such design is complex and expensive from today's point of view, so that only a few actually safe camera systems exist on the market as safe sensor technology.

The combination of a standard camera with a safety controller cannot guarantee sufficient safety for the reasons mentioned above, so that a device according to the present invention has, in addition to the standard camera and the controller, a test unit 16 with which the operability of the standard camera can be verified. In other words, the test unit 16 is configured to ensure the proper operation of the imaging unit 12 in accordance with the relevant safety standards.

The test unit 16 comprises a processing unit 18 and a projection unit 20. The processing unit 18 and the projection unit 20 can form a functional unit and can be implemented in various ways.

According to the example embodiment shown in FIG. 1, the processing unit 18 is part of the controller 14. The processing unit 18 can be a hardware and/or a software module of the controller 14 or can be integrated into it. The processing unit 18 can make use of the safety-related set-up of the safety controller. Thereby, the test unit can be implemented cost-effectively, since components of the safety controller that are already in place can be shared. Alternatively, the processing unit 18 can also be designed, alone or in combination with the projection unit 20, as a stand-alone unit that is located in a separate housing spatially separated from the controller 14. Thus, the test unit can be easily retrofitted to existing systems, for example.

Regardless of its design, the processing unit 18 is configured to control the projection unit 20 and evaluate image data from the imaging unit 12. The projection unit 20 can be a device that is able to project patterns at certain positions in the working area. The projection unit 20 can be a laser, video or hologram projector.

The projection unit 20 can project into the working area a pattern with defined properties that are detectable by the imaging unit 12. "Detectable" in this context means that the defined properties can be extracted from the recorded image data of the imaging unit 12 by the processing unit 18.

The pattern can be a dynamic pattern where the defined properties change continuously over time. The defined properties may be determined by the pattern itself or by the type of projection. For example, the defined properties can be a shape or an intensity of the pattern. Alternatively or in addition, the defined properties can be determined by a position in the working area into which the pattern is projected. Furthermore, the projected pattern may be projected in a spectrum not visible to humans as long as the pattern is detectable by the imaging unit 12. Furthermore, according to another example embodiment, the pattern may not be displayed continuously, but recurrently at defined intervals.

The processing unit 18 is configured to receive and process image data from the imaging unit 12. The processing unit 18 can extract the projected pattern from the image data and determine its specific properties. If these extracted specific characteristics correspond to an expectation, it can be concluded that the imaging unit 12 is operating properly. On the other hand, if the processing unit 18 is not able to extract the projected pattern from the image data, or if the specific properties deviate from the defined properties of a certain expectation, an error of the imaging sensors can be concluded. As a reaction, the controller can then cause the technical installation to be transferred to a safe state. A safety controller can be configured to provide an output signal for safe outputs only if the processing unit 18 continuously signals the operability of the imaging unit 12. In this way, a safety function according to the relevant safety standards can be implemented using a standard camera.

Figure 2:
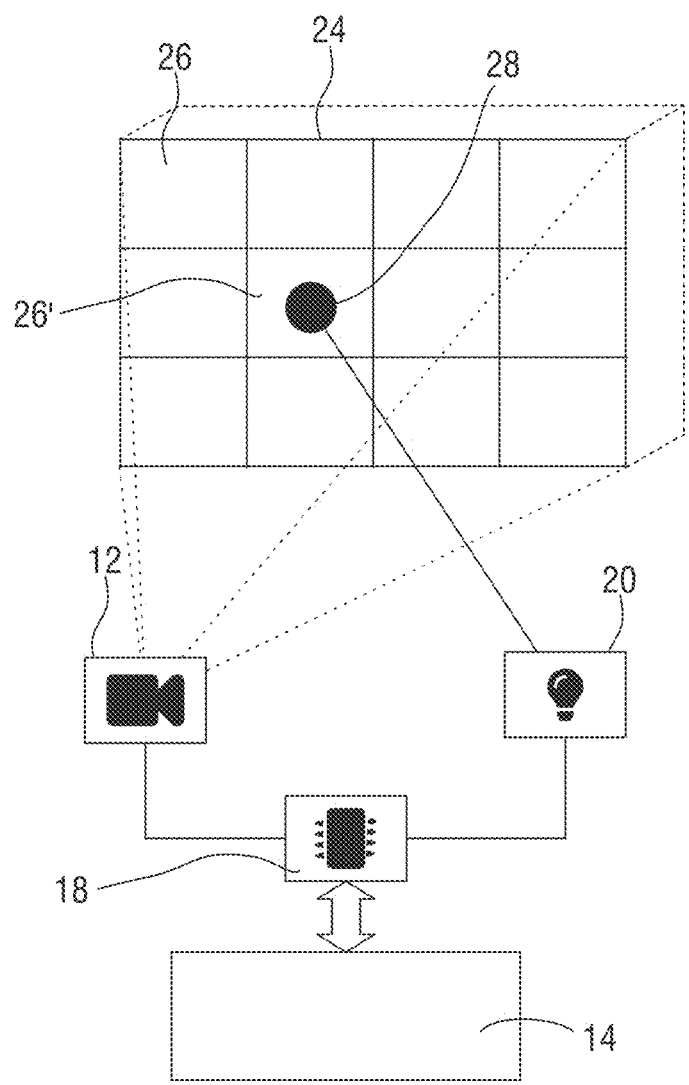
FIG. 2 is a schematic representation of a monitoring of a defined working area by an apparatus according to an example embodiment.

FIG. 2 shows, as an example, the monitoring of a defined working area with an apparatus according to an example embodiment. The working area can be a safety area of a technical installation (not shown here), for example, within which a danger to a person or object can arise during operation of the technical installation. In such a scenario, the safety function can include shutting down the technical installation if intrusion into the working area is detected.

According to the example embodiment, the intrusion is detected by the imaging unit 12. Once the controller detects a deviation of the image captured by the imaging unit 12 from a defined reference image, the controller 14 can transfer the technical installation into a safe state.

As indicated in FIG. 2, the imaging unit 12 can capture the danger area as a two-dimensional image. A comparison of an image of the imaging unit 12 with a reference image can then be carried out pixel by pixel. If a defined number of pixels deviates from the reference image, it can be concluded that a condition in the working area has changed, e.g. that a person has entered the working area. The change of state can be a triggering event that triggers the safety function.

It goes without saying that this relatively simple comparison is only one way of evaluating the image data of an imaging unit 12. Depending on the type and extent of the image data, evaluations that are more complex are conceivable in order to record and monitor a defined status in the working area. In another example, a three-dimensional space can be monitored by the imaging unit 12 (indicated here by dashed lines) by recording and evaluating image data with three-dimensional information.

The test unit 16 can be configured independently of the type of condition monitoring to verify the operability of the imaging unit 12.

According to the example embodiment, the working area 24 is divided into a number of individual segments 26. To verify the operability, the projection unit 20 is instructed by the processing unit 18 to project a pattern 28 into a certain segment 26 in the working area 24. The pattern 28 is in this example a dot pattern, which is projected in segment 26', for example.

While the processing unit 18 instructs the projection unit 20 to project the pattern, the processing unit 18 receives and evaluates the image data from the imaging unit 12. Using suitable image processing, the processing unit 18 can extract the pattern 28 from the images taken by imaging unit 12 and determine in which segment 26 of working area 24 the pattern 28 has been detected. If the segment 26 determined by the processing unit 18 matches the segment into which the projection unit 20 has been instructed to project the pattern 28, the imaging unit 12 can be assumed to operate properly. If the positions do not match or the pattern cannot be extracted from the image data, it can be concluded that the imaging unit 12 or its coupling to the controller 14 is malfunctioning.

Both the instruction into which segment 26 the pattern is to be projected and the evaluation whether the detected pattern is in this segment can be carried out by the controller 14. In other words, the processing unit 18 can be fully integrated into a safety controller. It is therefore not necessary for the imaging unit 12, the processing unit 18 or the projection unit 20 to be fail-safe devices on their own, as long as the instruction and evaluation is performed by a fail-safe device.

In case one of these non-safe components does not work reliably, an error would be generated at the latest in a next processing cycle, in which the safety controller instructs the projection unit 20 to project a pattern into another segment, because the projected pattern and the expectation do not match. If, for example, the projection unit 20, despite the instruction to project the pattern 28 into another segment 26, continues to display the pattern in the current segment 26, the pattern detected by the imaging unit 12 would not match the expectation of the safety controller. Accordingly, the safety controller will execute the safety reaction and bring about the safe state. In this way, low-cost non-failsafe standard components can be used for both the imaging unit 12 and the test unit 16, especially the projection unit 20 of the test unit 16, allowing a cost-effective implementation of the system.

The projection of the pattern 28 into the working area 24 can be systematic or random, wherein a different set of errors can be detected by a systematic projection than by a random projection. It is therefore conceivable to project a pattern 28 systematically into the working area 24 in a first interval and randomly in a second interval. Thereby, a large number of possible errors can be reliably detected and, where applicable, their cause can be clearly identified.

It goes without saying that working area 24 is not limited to a two-dimensional working area as shown here. It is also conceivable to cover a three-dimensional working space, wherein the defined property of the projected pattern is a three-dimensional characteristic. The three-dimensional characteristic can be a three-dimensional spatial coordinate, for example. Thereby, even complex working areas/spaces can be monitored reliably and fail-safe by standard components in interaction with a safety controller.

Figure 3:
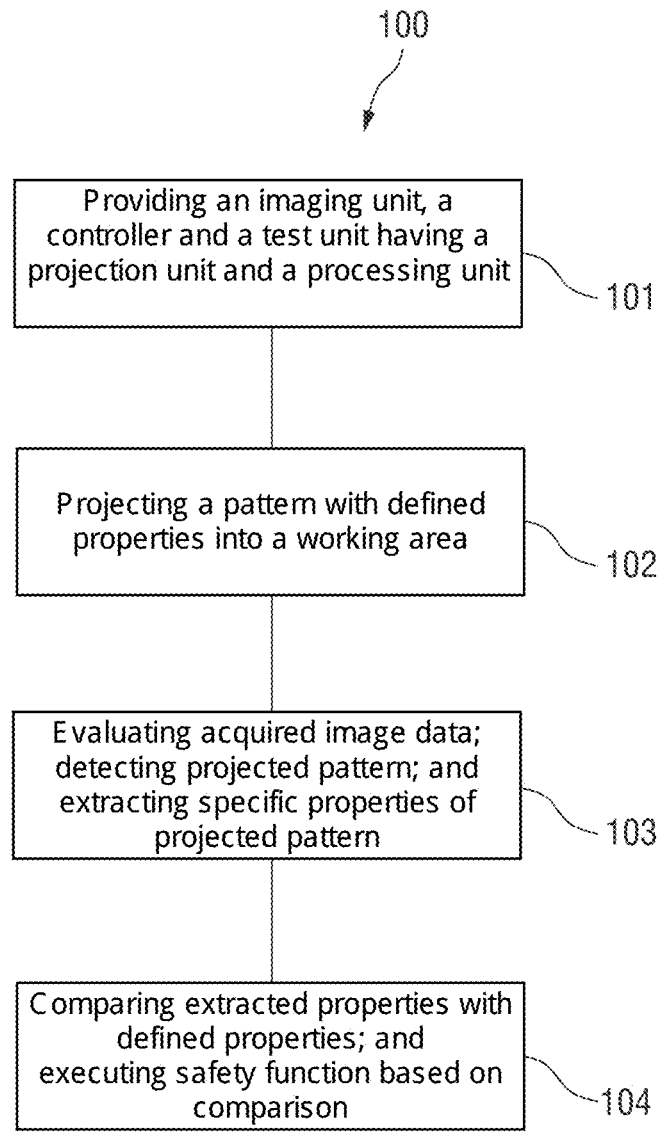
FIG. 3 is a flowchart of a method for carrying out a safety function according to an example embodiment.

FIG. 3 shows in a flowchart a method for carrying out a safety function according to an example embodiment of the present invention.

The method is designated in its entirety by reference numeral 100. A first step 101 includes providing an imaging unit, a controller, and a test unit having a projection unit and a processing unit.

In a second step 102, the projection unit projects a pattern with defined properties into a working area.

Then (step 103), the processing unit evaluates the image data acquired by the imaging unit, detects the projected pattern 28 and extracts its specific properties.

Finally, in step 104, the processing unit compares the specific properties of the detected projected pattern with the defined properties and triggers a safety-related reaction if the specific properties of the detected pattern do not match the defined properties or if the pattern could not be detected at all.

It goes without saying that the method, as shown in FIG. 3, only outlines the basic steps required to carry out the relevant procedure, namely verifying the operability of the imaging sensors. In addition, further steps are conceivable which are carried out to perform the safety function as a whole. It is also evident that the steps of projecting, detecting, and comparing are carried out continuously or repeatedly at defined intervals to ensure the safety function during operation of the system to be monitored. Furthermore, it is conceivable that an additional calibration step is performed once or regularly to align the imaging unit 12 and the test unit 16.

The phrase at least one of A, B, and C should be construed to mean a logical (A OR B OR C), using a non-exclusive logical OR, and should not be construed to mean "at least one of A, at least one of B, and at least one of C."

Overall, the present invention is not limited by the examples of implementation presented here, but is defined by the following claims.

What is claimed is:

1. An apparatus for carrying out a safety function, the apparatus comprising:
    an imaging unit configured to acquire an event that triggers the safety function within a defined working area;
    a controller configured to carry out a safety-related reaction based on the triggering event; and
    a test unit configured to verify operability of the imaging unit comprising a processing unit and a projection unit,
    wherein the projection unit is configured to project a pattern with defined properties into the working area,
    wherein the processing unit is configured to:
        evaluate image data acquired by the imaging unit to detect the projected pattern within the acquired image data,
        extract specific properties of the detected projected pattern, and
        compare the specific properties of the detected projected pattern with the defined properties,
    wherein the pattern is a dynamic pattern in which the defined properties change continuously over time, and
    wherein the defined properties change systematically in a first time interval and randomly in a second time interval.

2. The apparatus according to claim 1, wherein the controller is configured to carry out the safety-related reaction based on the comparison of the extracted specific properties with the defined properties.

3. The apparatus according to claim 1, wherein:
    the controller is a safety controller with safety-related set-up; and
    solely the safety controller is configured to ensure fail-safe execution of the safety-related reaction.

4. The apparatus according to claim 3, wherein:
    the test unit is at least partially integrated into the safety controller; and
    at least the processing unit makes use of the safety-related set-up to ensure that the processing unit is fail-safe.

5. The apparatus according to claim 3, wherein:
    the test unit is configured as a module for the safety controller; and
    at least the processing unit makes use of the safety-related set-up to ensure that the processing unit is fail-safe.

6. The apparatus according to claim 1, wherein the controller is configured to set the defined properties of the pattern.

7. The apparatus according to claim 1, wherein the defined properties change either of systematically and randomly.

8. The apparatus according to claim 1, wherein:
    the defined properties comprise positional information; and
    the projection unit is configured to project the pattern into the working area according to the positional information.

9. The apparatus according to claim 1, wherein:
    the working area is divided into a plurality of defined segments; and
    the projection unit is configured to generate the pattern at least once in each defined segment in a defined period of time.

10. The apparatus according to claim 1, wherein:
    the working area is a three-dimensional working space; and
    the pattern has a three-dimensional characteristic as a defined property that is detectable by the imaging unit.

11. The apparatus according to claim 10, wherein the three-dimensional characteristic changes continuously over time.

12. The apparatus according to claim 1, wherein the pattern is a dot pattern.

13. The apparatus according to claim 1, wherein the projection unit is a laser projector.

14. The apparatus according to claim 1, wherein the imaging unit is a non-safe camera unit that is unable to ensure a fail-safe detection autonomously.

15. A test unit for verifying operability of an imaging unit, the test unit comprising:
    a processing unit; and
    a projection unit,
    wherein the projection unit is configured to project a pattern with defined properties into a working area,
    wherein the processing unit is configured to:
        evaluate image data acquired by the imaging unit to detect the projected pattern within the acquired image data,
        extract specific properties of the detected projected pattern, and
        compare the specific properties of the detected projected pattern with the defined properties,
    wherein the pattern is a dynamic pattern in which the defined properties change continuously over time, and
    wherein the defined properties change systematically in a first time interval and randomly in a second time interval.

16. The test unit according to claim 15, wherein the processing unit is configured to forward the specific properties of the detected projected pattern to a controller.

17. A method for carrying out a safety function, the method comprising:
    projecting a pattern with defined properties into a working area;
    acquiring image data of the working area with an imaging unit;
    evaluating the image data acquired by the imaging unit to detect the projected pattern;
    extracting specific properties of the detected projected pattern;

comparing the specific properties of the detected projected pattern with the defined properties; and selectively carrying out a safety-related function in response to the comparison, wherein the pattern is a dynamic pattern in which the defined properties change continuously over time, and wherein the defined properties change systematically in a first time interval and randomly in a second time interval.

18. The method according to claim 17, wherein:

the working area is divided into a plurality of defined segments; and the method further comprises generating the pattern at least once in each of the plurality of defined segments within a defined period of time.

* * * * *